United States Patent
Tsubouchi et al.

(12)

(10) Patent No.: US 6,589,086 B2
(45) Date of Patent: Jul. 8, 2003

(54) OUTBOARD MARINE DRIVE WITH AN INTERNAL COMBUSTION ENGINE

(75) Inventors: Masanori Tsubouchi, Tokyo (JP); Makoto Yazaki, Tokyo (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/071,955

(22) Filed: Feb. 6, 2002

(65) Prior Publication Data

US 2002/0111090 A1 Aug. 15, 2002

(30) Foreign Application Priority Data

Feb. 14, 2001 (JP) ........................................ 2001-037191

(51) Int. Cl.[7] .............................................. B63H 21/10
(52) U.S. Cl. ...................................................... 440/88
(58) Field of Search ............................ 440/77, 76, 88; 123/195 P, 195 W, 198 R, 196 P

(56) References Cited

U.S. PATENT DOCUMENTS

| 4,828,519 A | * | 5/1989 | Watanabe | 440/88 |
| 6,227,921 B1 | * | 5/2001 | Feehan | 440/88 |
| 6,276,327 B1 | * | 8/2001 | Fukuoka et al. | 123/196 W |
| 6,346,018 B1 | * | 2/2002 | Watanabe | 440/77 |

FOREIGN PATENT DOCUMENTS

| JP | 8-334010 | 12/1976 |
| JP | 5-911 | 1/1993 |
| JP | 11-81968 | 3/1999 |

* cited by examiner

Primary Examiner—Ed Swinehart
(74) Attorney, Agent, or Firm—MacPherson Kwok Chen & Heid LLP

(57) ABSTRACT

In an outboard marine drive with an internal combustion engine having a vertically extending crankshaft and an oil pan located below a cylinder block, a sidewall of the cylinder block is provided with an insertion hole of an oil level gauge so that the oil level gauge can pass through the insertion hole into the oil pan. Such a configuration can minimize the length of the oil level gauge and allow an easy handling of the same, to thereby facilitate oil level inspection work.

5 Claims, 3 Drawing Sheets

OUTBOARD MARINE DRIVE WITH AN INTERNAL COMBUSTION ENGINE

TECHNICAL FIELD

The present invention relates to an outboard marine drive with an internal combustion engine, particularly to an outboard marine drive with an internal combustion engine having a generally vertically extending crankshaft and an oil pan located generally below a cylinder block.

BACKGROUND OF THE INVENTION

Conventionally, in an outboard marine drive with an internal combustion engine having a vertical crankshaft, an oil pan of the internal combustion engine is usually mounted at a position under a cylinder block and offset towards a cylinder head so as not to interfere with a drive shaft which vertically extends along an axis of the crankshaft. In such an arrangement, when the outboard marine drive is attached to a stern plate of a watercraft, the oil pan is located at a rearward position away from the stern plate.

On the other hand, it is desirable that the amount of oil in the oil pan can be checked easily by just detaching an engine cover for covering an upper part of the engine, and in this point of view, it is preferred that a receptacle of an oil level gauge consisting of a stick-like member is provided at an easily accessible position, i.e., as closely to the stern plate as possible and at as high as possible.

However, in a V-shaped engine having a pair of cylinder heads projecting out in lateral directions, it is difficult to provide the receptacle of the oil level gauge at such an easily accessible position. Thus, in order to solve such a problem, Japanese Utility Model Application Laid-Open Publication No. 5-911 has proposed a configuration in which an oil level gauge guiding tube is provided at a position between a pair of cylinder banks forming a V-shape and extends in parallel with a crankshaft.

In the configuration proposed in the above publication, however, although the oil level gauge can be passed through and pulled out from the top of the engine, the guiding tube provided between the pair of cylinder banks needs to have substantially the same length as the overall engine dimension in a direction along the crankshaft, and the oil level gauge needs to have an extension part that corresponds to the length of the crankshaft and that does not serve for oil level inspection, whereby leading to a higher manufacturing cost. Also, the lengthy oil level gauge tends to cause a difficulty in its insertion and removal operations.

BRIEF SUMMARY OF THE INVENTION

In view of such problems of the prior art, a primary object of the present invention is to provide an outboard marine drive with an internal combustion engine having a vertically extending crankshaft which can improve the work efficiency of the oil amount inspection without causing an increase in the manufacturing cost.

A second object of the present invention is to provide an outboard marine drive with an internal combustion engine having a vertically extending crankshaft which can avoid using an unnecessarily lengthy oil level gauge to thereby allow easy handling of the oil level gauge.

According to the present invention, such objects can be accomplished by providing an outboard marine drive, comprising: an internal combustion engine having a crankshaft which extends generally vertically; a drive shaft extending generally vertically and operably connected to the crankshaft so as to transmit an output from the internal combustion engine to a propeller connected to a lower end of the drive shaft; the internal combustion engine comprising a cylinder block, an oil pan located generally below the cylinder block so as not to interfere with the drive shaft, and a stick-like oil level gauge for inspecting an amount of oil in the oil pan, wherein one sidewall of the cylinder block is provided with an insertion hole for allowing the oil level gauge to be passed therethrough into the oil pan.

Thus, since the insertion hole of the oil level gauge is formed in the sidewall of the cylinder block, the length of the oil level gauge can be significantly decreased compared with the conventional oil level gauge which is inserted from the top of the engine, and therefore, the insertion and removal operations of the oil level gauge can be considerably facilitated. Further, the insertion hole formed in the sidewall of the cylinder block can allow a handle of the oil level gauge received in the insertion hole to be placed near the stern plate of the watercraft, and therefore, the user can easily access the oil level gauge to inspect the amount of oil. Thus, an oil level inspection work can be considerably facilitated.

Preferably, the oil pan comprises a main reservoir part located generally below the cylinder block and at the rear of the drive shaft, and the insertion hole of the oil level gauge is provided at such a position that an axis of the oil level gauge is inclined forwardly and upwardly in an outward direction from a central portion of the main reservoir part of the oil pan when the oil level gauge is fully inserted into the insertion hole. This can allow the handle of the oil level gauge to project from the insertion hole sideways and forwardly (or towards the stern plate) when the oil level gauge is received in the insertion hole, and therefore the user can easily pull out the handle of the oil level gauge to inspect the oil level.

Particularly, if the cylinder block comprises: a pair of cylinder banks arranged in a V-shape diverging in a rearward direction when seen in a plan view; and a skirt portion provided in a front portion of the cylinder block to constitute part of a crankcase for accommodating the crankshaft therein, it will be preferable that the insertion hole of the oil level gauge is formed at a part of an outer sidewall of either one of the pair of cylinder banks near the skirt portion. This can place the insertion hole at an easily accessible position while favorably defining the direction of axis of the oil level gauge received in the insertion hole. Further, because the part of an outer sidewall of one of the pair of cylinder banks near the skirt portion is recessed when seen in a plan view, projection of the handle of the oil level gauge from an outer profile of the engine can be eliminated or minimized.

When the cylinder block comprises an oil return passage for allowing the oil to return to the oil pan from a cam chamber defined in a cylinder head provided at a rear end of the cylinder block, it is preferable that the insertion hole of the oil level gauge consists of a cast hole for defining a part of the oil return passage. This can make it unnecessary to separately form the insertion hole, and thus simplify the manufacturing process.

More preferably, the insertion hole of the oil level gauge is covered by a cover provided with a receptacle which is adapted to guide insertion of the oil level gauge into the insertion hole. The cover may consist of a plate provided with a tube like member for constituting the receptacle. Such a cover with a receptacle can be made easily and at low cost, and favorably define the direction of axis of the oil level gauge passed therethrough.

Other and further objects, features and advantages of the invention will appear more fully from the following description.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
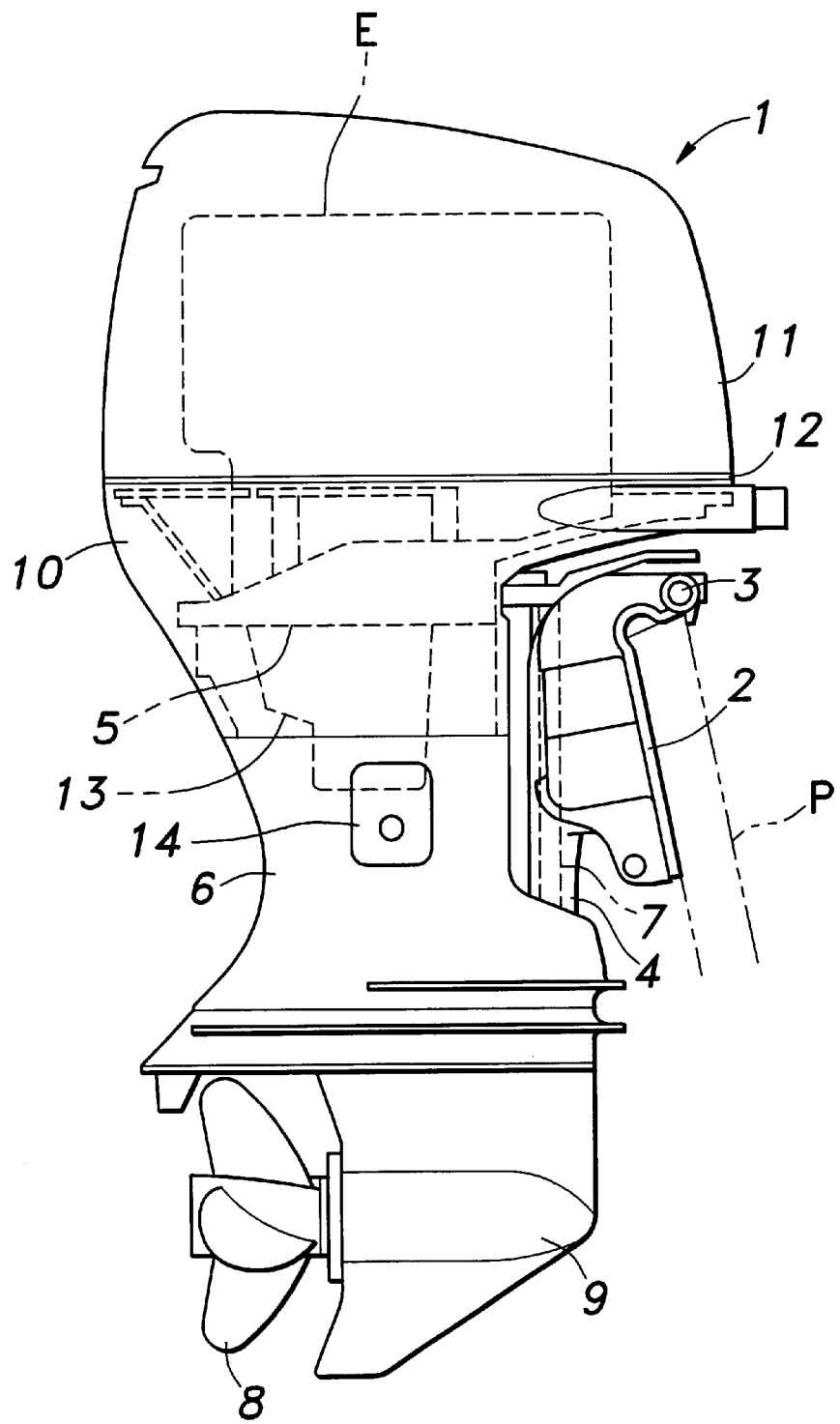
FIG. 1 is a general side view of an outboard marine drive to which the present invention is applied.

FIG. 1 is a side view for generally showing an outboard marine drive to which the present invention is applied. This outboard marine drive 1 is secured to a stern plate P of a watercraft such as a boat via a stern bracket 2.

A swivel case 4 is coupled to the stern bracket 2 so that a pivot action around a laterally extending tilt shaft 3 is possible. A front portion of an engine mount case 5 is attached to an upper end of the swivel case 4 and an extension case 6 accommodating a drive shaft therein is attached to the lower end of the swivel case 4 so that they can pivot around a vertically extending swivel shaft 7.

The engine mount case 5 is connected to an upper end of the extension case 6, and a lower end of the extension case 6 is connected to a gear case 9 supporting a propeller 8. The engine mount case 5, a lower part of an internal combustion engine E mounted on the engine mount case 5, and an upper part of the extension case 6 are covered by an under cover 10. Further, an engine cover 11 of a deep bowl-like shape with an opening at its underside is detachably attached to an upper opening rim of the under cover 10 to cover an upper part of the engine E mounted on the engine mount case 5.

In order to prevent intrusion of water through the contacting surfaces of the under cover 10 and the engine cover 11, a seal rubber 12 is interposed between the opening rims of the under cover 10 and the engine cover 11, and a lock device (not shown) provided near the contacting portions of these covers holds the covers in the engaged state.

An oil pan 13 for storing a lubricating oil is attached to a lower end of the engine mount case 5. To allow an access to a drain plug DP (see FIG. 3) provided in a bottom of the oil pan 13, an opening 14, which is usually closed by a lid, is formed in a side of the extension case 6.

Figure 2:
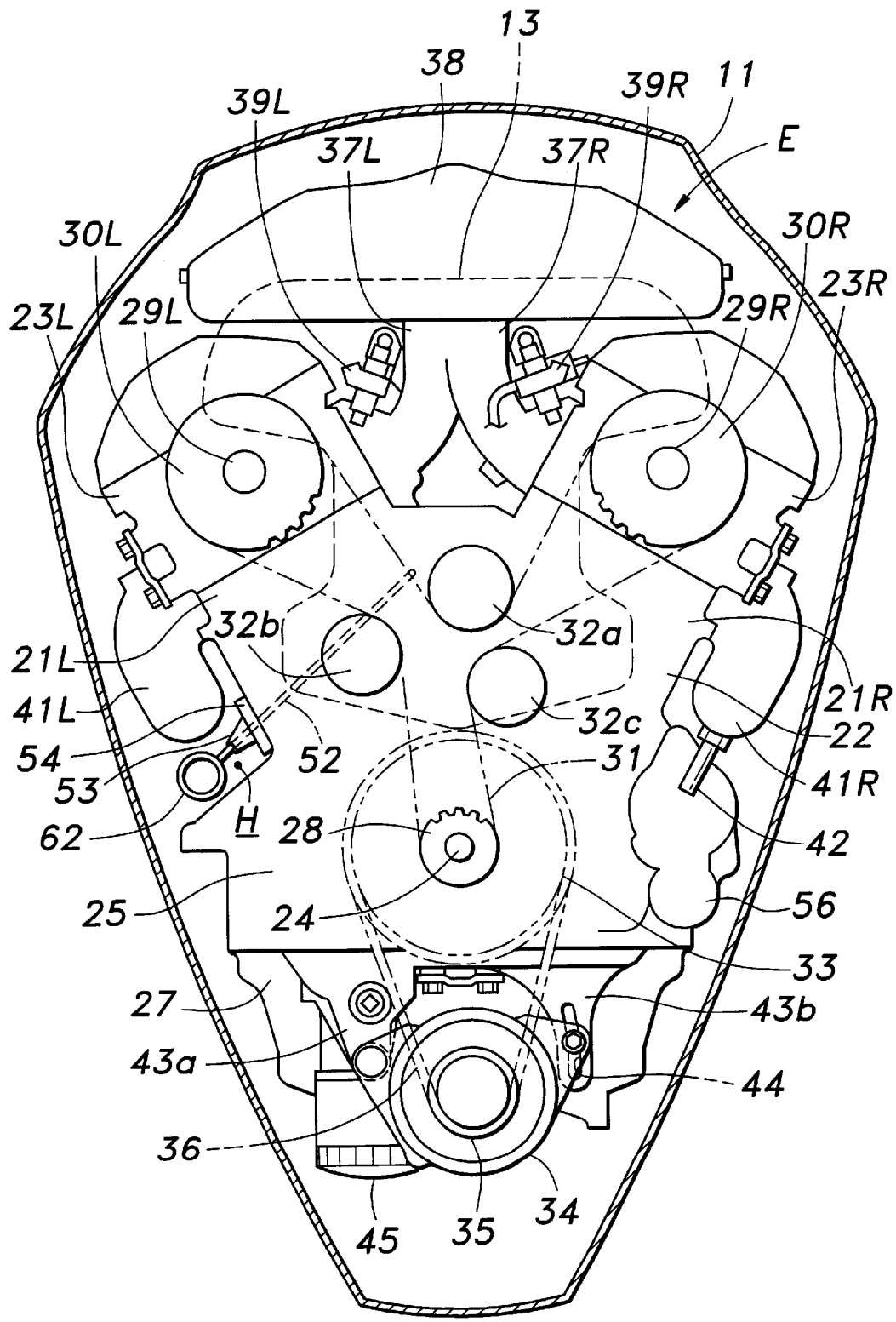
FIG. 2 is a top plan view of the outboard marine drive, showing an engine mount portion configured according to the present invention.
Figure 3:
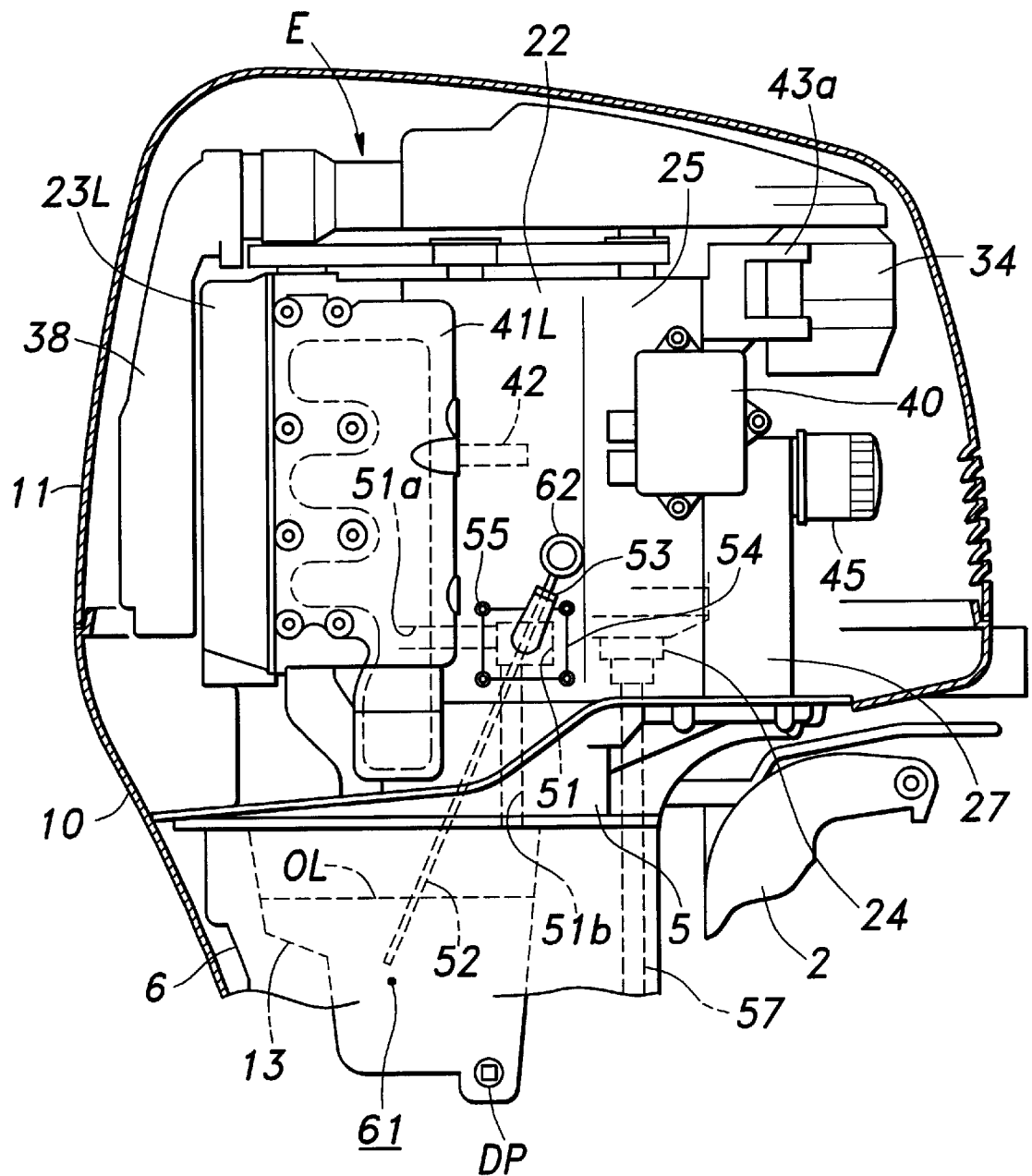
FIG. 3 is a left side view of the outboard marine drive, showing an engine mount portion configured according to the present invention.

FIGS. 2 and 3 show a mount portion of a vertical-crankshaft, four-stroke, V-type, six-cylinder engine E in the outboard marine drive shown in FIG. 1. This engine E comprises a cylinder block 22 having a pair of cylinder banks 21L, 21R and a pair of cylinder heads 23L, 23R joined to a rear end of the cylinder block 22 to define cam chambers (not shown) therein. The cylinder block 22 also has a skirt portion 25 unitarily formed in a front portion thereof to constitute part of a crankcase that accommodates a crankshaft 24, and a crankcase member 27 is joined to a front end of the skirt portion.

A cam shaft driving pulley 28 is secured to an upper end of the vertically arranged crankshaft 24, and cam shaft driven pulleys 30L, 30R are secured to an upper end of a pair of cam shafts 29L, 29R supported by the associated cylinder heads 23L, 23R, respectively. An endless timing belt 31, which is wound around the cam shaft driving pulley 28 and the cam shaft driven pulleys 30L, 30R, is guided and given a prescribed tension by three idle pulleys 32a, 32b, 32c including a tension pulley.

An electric generator driving pulley 33 is also secured to the upper end of the crankshaft 24, and an electric generator driving endless belt 36 is wound around the driving pulley 33 and a driven pulley 35 which is secured to an input shaft of an electric generator 34 fixedly attached to a front side of the crankcase member 27.

On a side of the mutually facing inward surfaces of the pair of cylinder heads 23L, 23R is provided a common air intake device 38 which is connected to the cylinder banks 21L, 23R via intake manifolds 37L, 37R, respectively. Each intake manifold 37L, 37R is provided with a fuel injection valve 39L, 39R. These fuel injection valves 39L, 39R are controlled by an electronic control device 40, which is attached to a side surface of the skirt portion 25, in such a manner that the control device 40 conducts computation based on various sensor signals so as to optimize the amount of fuel injection.

On an outward side surface of each cylinder head 23L, 23R is provided an associated exhaust manifold 41L, 41R. Although not clearly shown in the drawings, the combustion gas discharged from the exhaust manifolds 41L, 41R will flow through a passage provided in the engine mount case 5 into the extension case 6. On the front side of one exhaust manifold 41R (the right one in FIG. 2), at a middle portion in the direction of the crankshaft extension, is mounted an oxygen concentration sensor 42. Thus, by arranging the oxygen concentration sensor 42 so as to assume a forwardly oriented posture, it is possible to minimize an amount of projection of the oxygen concentration sensor 42 from an outer profile of the engine E.

The crankcase member 27 is unitarily formed with rearwardly projecting brackets 43a, 43b by casting so that the electric generator 34 can be mounted thereto. One end of the electric generator 34 is supported by one bracket 43a so as to be pivotable around a vertical axis, and the other end of the electric generator 34 is secured to the other bracket 43b by using an arcuate slot 44 which corresponds to a pivot path taken by the other end of the electric generator 34. Further, an oil filter 45 is attached to the front surface of the crankcase member 27 at a position below the electric generator 34.

At a part of one (for example, the left one) of the left and right sidewalls of the cylinder block 22 adjacent the skirt portion 25, a cast hole 51 is opened as a result of forming return passages 51a, 51b through which the lubricant oil is allowed to return from the cam chambers defined by the cylinder heads 23L, 23R to the oil pan 13. In other words, the cast hole 51 defines a part of the oil return passage 51a, 51b. The cast hole 51 is closed by a plate 54 secured to the cylinder block 22 with bolts 55, and the plate 54 is provided with a tube-like receptacle 53 through which a stick-like oil level gauge 52 is guidedly inserted toward the oil pan 13. Thus, the cast hole 51 is formed at a place that can be covered by the plate 54 and is used as an insertion hole of the oil level gauge 52. This can allow the oil level gauge insertion hole to be formed in the sidewall of the cylinder block 22 easily and thus contribute to simplifying the manufacturing process. Further, since the insertion hole 51 of the oil level gauge 52 is formed in the sidewall of the cylinder block 22, the length of the oil level gauge 52 can be minimized, allowing easy handling of the oil level gauge.

On the other side (or right side) of the skirt portion 25, a starter motor 56 is mounted.

The oil pan 13 is located at a position beneath the cylinder block 22 and offset towards the cylinder heads 23L, 23R so as to avoid interfering a drive shaft 57 that extends vertically along the axis of the crankshaft 24. Further, the axis of the oil level gauge 52 inserted through the oil level gauge receptacle 53 is inclined so that the oil level gauge 52 extends from a central portion 61 of a main reservoir part of the oil pan 13 upwardly in a forward and outward direction. The axis of the oil level gauge 52 thus inclined allows a handle 62 of the oil level gauge 52 to be positioned close to the stern plate P and above an opening rim surface of the under cover 10 to which the engine cover 11 is engaged, allowing a user to easily access the oil level gauge. Further, since the handle 62 of the oil level gauge 52 is also inclined forwardly and outwardly, the user can easily pull out and insert the oil level gauge 52 from and into the insertion hole 51. Moreover, the handle 62 is placed in a recess H formed on the side of the cylinder block 22 between the skirt portion 25 and the cylinder bank 21L, and thus would not be obstructive.

When the amount of oil is inspected, the outboard marine drive 1 is pivoted around the swivel shaft 7 so that the side thereof comes closer to the stern plate P. Since the handle 62 can be made to face the stern plate P with a small pivoting angle, the inspection work can be carried out easily. Further, because the oil level gauge 52 is inserted into the oil at a large angle with respect to an oil level OL, the oil adhering to the oil level gauge 52 can be checked more easily.

As described above, according to the present invention, since the insertion hole of the oil level gauge is provided in a sidewall of the cylinder block, the length of the oil level gauge can be minimized, and thus, easy handling of the oil level gauge and reduced manufacturing cost can be achieved. Further, since the oil pan comprises a main reservoir part located generally below the cylinder block and at the rear of the drive shaft, and the insertion hole of the oil level gauge is provided at such a position that an axis of the oil level gauge is inclined forwardly and upwardly in an outward direction from a central portion of the main reservoir part of the oil pan when the oil level gauge is fully inserted into the insertion hole, the handle of the oil level gauge is allowed to be positioned near the stern plate and above the engaging surface of the engine cover, and therefore it is possible to carry out the oil amount inspection by simply removing the engine cover.

Further, in the above embodiment, since a cast hole for forming an oil return passage is used as the insertion hole of the oil level gauge, it is avoided to form an inclined bore in the cylinder block by machining, and thus the manufacturing cost can be reduced. Also, the cover (plate) with a receptacle for closing the cast hole can contribute achieving a favorably inclined oil level gauge at low cost and in an easy fashion.

Although the present invention has been described in terms of a preferred embodiment thereof, it is obvious to a person skilled in the art that various alterations and modifications are possible without departing from the scope of the present invention which is set forth in the appended claims.

What is claimed is:

1. An outboard marine drive, comprising:
an internal combustion engine having a crankshaft which extends generally vertically;
a drive shaft extending generally vertically and operably connected to the crankshaft so as to transmit an output from the internal combustion engine to a propeller connected to a lower end of the drive shaft;
the internal combustion engine comprising a cylinder block, an oil pan located generally below the cylinder block so as not to interfere with the drive shaft, and a dipstick for inspecting an amount of oil in the oil pan,
wherein one sidewall of the cylinder block is provided with an insertion hole for allowing the dipstick to be passed therethrough into the oil pan,
wherein the cylinder block comprises:
a pair of cylinder banks arranged in a V-shape diverging in a rearward direction when seen in a plan view; and a skirt portion provided in a front portion of the cylinder block to constitute part of a crankcase for accommodating the crankshaft therein, and
wherein the insertion hole of the dipstick is formed at a part of an outer sidewall of either one of the pair of cylinder banks near the skirt portion.

2. An outboard marine drive, comprising:
an internal combustion engine having a crankshaft which extends generally vertically;
a drive shaft extending generally vertically and operably connected to the crankshaft so as to transmit an output from the internal combustion engine to a propeller connected to a lower end of the drive shaft;
the internal combustion engine comprising a cylinder block, an oil pan located generally below the cylinder block so as not to interfere with the drive shaft, and a dipstick for inspecting an amount of oil in the oil pan,
wherein one sidewall of the cylinder block is provided with an insertion hole for allowing the dipstick to be passed therethrough into the oil pan,
wherein the cylinder block comprises an oil return passage for allowing the oil to return to the oil pan from a cam chamber defined in a cylinder head provided at a rear end of the cylinder block, and the insertion hole of the dipstick consists of a cast hole for defining a part of the oil return passage.

3. An outboard marine drive according to claim 2, wherein the insertion hole of the dipstick is covered by a cover provided with a receptacle which is adapted to guide insertion of the dipstick into the insertion hole.

4. An outboard marine drive according to claim 2, wherein the oil pan comprises a main reservoir part located generally below the cylinder block and at the rear of the drive shaft, and the insertion hole of the dipstick is provided at such a position that an axis of the dipstick is inclined forwardly and upwardly in an outward direction from a central portion of the main reservoir part of the oil pan when the dipstick is fully inserted into the insertion hole.

5. An outboard marine drive, comprising:
an internal combustion engine having a crankshaft which extends generally vertically;
a drive shaft extending generally vertically and operably connected to the crankshaft so as to transmit an output from the internal combustion engine to a propeller connected to a lower end of the drive shaft;
the internal combustion engine comprising a cylinder block, an oil pan located generally below the cylinder block so as not to interfere with the drive shaft, and a dipstick for inspecting an amount of oil in the oil pan,
wherein one sidewall of the cylinder block is provided with an insertion hole for allowing the dipstick to be passed therethrough into the oil pan,
wherein the oil pan comprises a main reservoir part located generally below the cylinder block and at the rear of the drive shaft, and the insertion hole of the dipstick is provided at such a position that an axis of the dipstick is inclined forwardly and upwardly in an outward direction from a central portion of the main reservoir part of the oil pan when the dipstick is fully inserted into the insertion hole; and
wherein the cylinder block comprises: a pair of cylinder banks arranged in a V-shape diverging in a rearward direction when seen in a plan view; and a skirt portion provided in a front portion of the cylinder block to constitute part of a crankcase for accommodating the crankshaft therein, and
wherein the insertion hole of the dipstick is formed at a part of an outer sidewall of either one of the pair of cylinder banks near the skirt portion.

* * * * *